(12) United States Patent
Wan et al.

(10) Patent No.: US 12,137,203 B2
(45) Date of Patent: Nov. 5, 2024

(54) METHOD AND SYSTEM FOR OPTICAL CALIBRATION OF 3D PRINTER

(71) Applicant: GUANGZHOU HEYGEARS IMC.INC, Guangdong (CN)

(72) Inventors: Xin Wan, Guangzhou (CN); Weitao Li, Guangzhou (CN); Peihui Wu, Guangzhou (CN); Songlin She, Guangzhou (CN); Peiyan Gui, Guangzhou (CN); Heyuan Huang, Guangzhou (CN)

(73) Assignee: GUANGZHOU HEYGEARS IMC. INC, Guangdong (CN)

( * ) Notice: Subject to any disclaimer, the term of this patent is extended or adjusted under 35 U.S.C. 154(b) by 358 days.

(21) Appl. No.: 17/603,913

(22) PCT Filed: Dec. 8, 2020

(86) PCT No.: PCT/CN2020/134574
§ 371 (c)(1),
(2) Date: Oct. 14, 2021

(87) PCT Pub. No.: WO2022/027891
PCT Pub. Date: Feb. 10, 2022

(65) Prior Publication Data
US 2022/0311995 A1    Sep. 29, 2022

(30) Foreign Application Priority Data
Aug. 7, 2020   (CN) .......................... 202010787710.9

(51) Int. Cl.
*H04N 17/00*    (2006.01)
*B29C 64/386*   (2017.01)
(Continued)

(52) U.S. Cl.
CPC .......... *H04N 17/002* (2013.01); *B29C 64/386* (2017.08); *B33Y 50/00* (2014.12); *G06T 7/73* (2017.01); *G06T 7/80* (2017.01)

(58) Field of Classification Search
None
See application file for complete search history.

(56) References Cited

U.S. PATENT DOCUMENTS

| | | | | |
|---|---|---|---|---|
| 2015/0077573 A1* | 3/2015 | Ishikawa | ................. | G06T 3/005 348/189 |
| 2015/0189267 A1* | 7/2015 | Kaji | ..................... | H04N 9/3182 348/187 |
| 2015/0302560 A1* | 10/2015 | Sumiyoshi | .............. | G06T 5/006 382/203 |

FOREIGN PATENT DOCUMENTS

| | | |
|---|---|---|
| CN | 105216330 A | 1/2016 |
| CN | 107945130 A | 4/2018 |

(Continued)

OTHER PUBLICATIONS

International Search Report issued in PCT/CN2020/134574; mailed Apr. 29, 2021.

(Continued)

*Primary Examiner* — Andrae S Allison
(74) *Attorney, Agent, or Firm* — Samson G. Yu

(57) ABSTRACT

Disclosed are a method and system for optical calibration of a 3D printer. The method includes: projecting, by an optical apparatus, a projection image to a projection platform, placing a calibration plate on the projection platform, and capturing the projection platform; identifying the coordinates of calibration points and the coordinates of actual projection points according to the captured image to obtain a matrix of calibration points and a matrix of actual projection points; rotating and translating the matrix of the calibration points and/or the matrix of the actual projection (Continued)

(a)

(b)

(c)

points, and calculating a distance value $T_0$ between the calibration points and the actual projection points in an image coordinate system; converting the $T_0$ in the image coordinate system into an offset $C_1$ in a pixel coordinate system, and inversely distorting an initial ideal projection image according to the offset $C_1$ to offset optical distortion.

15 Claims, 3 Drawing Sheets

(51) Int. Cl.
  *B33Y 50/00* (2015.01)
  *G06T 7/73* (2017.01)
  *G06T 7/80* (2017.01)

(56) References Cited

FOREIGN PATENT DOCUMENTS

| | | | |
|---|---|---|---|
| CN | 105657389 B | * | 5/2018 |
| CN | 110443856 A | | 11/2019 |
| CN | 110751609 A | | 2/2020 |
| CN | 111899308 A | | 11/2020 |

OTHER PUBLICATIONS

Written Opinion of the International Searching Authority issued in PCT/CN2020/134574; mailed Apr. 29, 2021.

* cited by examiner

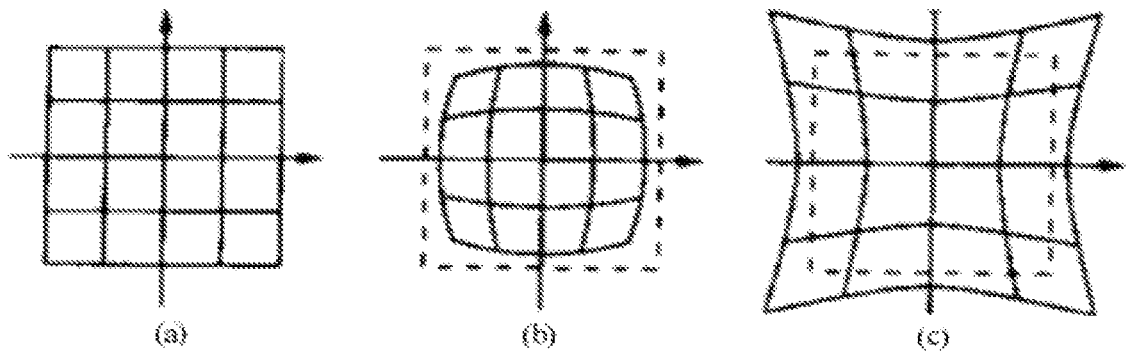

FIG. 1

A projection image is projected by an optical machine to a projection platform, and a calibration plate is placed on the projection platform so that the calibration plate is staggered with the projection image, and then the projection platform is captured. — 100

The coordinates of calibration points and the coordinates of actual projection points are identified according to the captured image to obtain a matrix of calibration points and a matrix of actual projection points. — 200

The matrix of the calibration points and/or the matrix of the actual projection points are/is rotated and translated, and then a distance value $T_0$ between the calibration points and the actual projection points in the image coordinate system is calculated. — 300

The $T_0$ in the image coordinate system is converted into an offset $C_i$ in the pixel coordinate system, and an initial ideal projection image can be inversely distorted according to the offset $C_i$. Then, the projection image after inverse distortion processing is projected again to obtain a new actual projection image, so that the error between the new actual projection image and the ideal projection image meets the requirements. — 400

FIG. 2

METHOD AND SYSTEM FOR OPTICAL CALIBRATION OF 3D PRINTER

CROSS-REFERENCE TO RELATED APPLICATION

This application is a national stage filing under 35 U.S.C. § 371 of international application number PCT/CN2020/134574, filed Dec. 8, 2020, which claims priority to Chinese patent application No. 202010787710.9 filed Aug. 7, 2020. The contents of these applications are incorporated herein by reference in their entirely.

TECHNICAL FIELD

This disclosure relates to the technical field of 3D printing, and in particular, to a method and system for optical calibration of a 3D printer.

BACKGROUND

At present, based on the principle that liquid photosensitive resin is cured after being irradiated by an optical apparatus, photo-curing 3D printing makes materials formed layer by layer, and then superposes them into three-dimensional entities layer by layer. Surface exposure photo-curing 3D printing is one of the branches of photo-curing 3D printing, which is formed by projecting images. However, the projected image will be distorted due to the influence of lens optical distortion. As shown in FIG. 1, Figure (a) is an ideal projection, Figure (b) is a possible barrel distortion, and Figure (c) is a possible pincushion distortion. Therefore, it is necessary to calibrate the optical apparatus module for projection.

SUMMARY

The purpose of this disclosure is to provide a method and a system for optical calibration of a 3D printer, which solve the technical problem that the optical apparatus module for projection needs to be calibrated in the existing technology in the field of 3D printing to a certain extent.

This disclosure provides a method for optical calibration of a 3D printer, which comprises the following steps:

At step 100, a projection image is projected by an optical machine to the projection platform. The calibration plate is placed on the projection platform. The projection platform is captured.

At step 200, the coordinates of calibration points and the coordinates of actual projection points are identified according to the captured image to obtain the matrix of calibration points and the matrix of actual projection points.

At step 300, the matrix of the calibration points and/or the matrix of the actual projection points are/is rotated and translated to convert the calibration points and the actual projection points into the same coordinate system, and then a distance value $T_0$ between the calibration points and the actual projection points in an image coordinate system is calculated.

At step 400, the $T_0$ in the image coordinate system is converted into an offset $C_1$ in a pixel coordinate system, and an initial ideal projection image is inversely distorted according to the offset $C_1$.

Both $T_0$ and $C_1$ are matrices composed of vectors.

Further, in the above technical scheme, the projection image is projected by the optical machine to the projection platform. The calibration plate is placed on the projection platform so that the calibration plate is staggered with the projection image, and then the projection platform is captured.

Further, in any of the above technical schemes, at step 200, the matrix of calibration points is obtained as $$P_1 = \begin{bmatrix} O_{1,1} & \cdots & O_{1,n} \\ \vdots & \ddots & \vdots \\ O_{m,1} & \cdots & O_{m,n} \end{bmatrix},$$

and the matrix of actual projection points is obtained as $$P_2 = \begin{bmatrix} L_{1,1} & \cdots & L_{1,n} \\ \vdots & \ddots & \vdots \\ L_{m,1} & \cdots & L_{m,n} \end{bmatrix}.$$

In the above formula, the data of $P_1$ and $P_2$ are based on the image coordinate system, and its unit is mm; m and n are the number of rows and columns of the matrix respectively.

Further, in any of the above technical schemes, at step 300, the rotated matrix of calibration points and the rotated matrix of actual projection points are as follows: $P_1{'}=R_1 P_1$, $P_2{'}=R_2 P_2$.

In the above formula, $P_1{'}$ is the rotated matrix of calibration points, $P_2{'}$ is the rotated matrix of actual projection points, and $R_1$ and $R_2$ are parameters of rotation matrix parameters.

Further, in any of the above technical schemes, for the rotation operation, the principle is as follows:

$$\begin{cases} x = x'\cos\theta - y'\sin\theta \\ y = x'\sin\theta + y'\cos\theta \end{cases};$$

A corresponding matrix formula is as follows:

$$\begin{bmatrix} x \\ y \end{bmatrix} = \begin{bmatrix} \cos\theta & -\sin\theta \\ \sin\theta & \cos\theta \end{bmatrix} \begin{bmatrix} x' \\ y' \end{bmatrix} = R \begin{bmatrix} x' \\ y' \end{bmatrix},$$

thus the rotation matrix parameter is obtained as $$R = \begin{bmatrix} \cos\theta & -\sin\theta \\ \sin\theta & \cos\theta \end{bmatrix}.$$

In the above formula, x' and y' are the rotated coordinate points; x and y are the original coordinate points.

Further, in any of the above technical schemes, after the rotation operation is completed, according to $T_0 = P_2{'} - P_1{'} - T'$, $T_0$ is calculated to obtain $$T_0 = \begin{bmatrix} d_{1,1} & \cdots & d_{1,n} \\ \vdots & \ddots & \vdots \\ d_{m,1} & \cdots & d_{m,n} \end{bmatrix}.$$

Then, the translation operation is completed.

In the above formula, d is a center offset between the calibration point and the projection point after rotation and translation; T' is a difference between the matrix of the actual projection points and the matrix of the calibration points taken from an area with a smallest distortion.

Further, in any of the above technical schemes, the parameters in $T_0$ matrix are firstly transformed into the parameters in pixel coordinate system, and then the result $$T_0' = \begin{bmatrix} d'_{1,1} & \cdots & d'_{1,j} \\ \vdots & \ddots & \vdots \\ d'_{k,1} & \cdots & d'_{k,j} \end{bmatrix}$$

is obtained by fitting operation.

In the above formula, d' is a center offset between the calibration point and the projection point in the pixel coordinate system; j and k respectively correspond to the length and width of the resolution of the image.

Further, in any of the above technical schemes, the position information of all pixels in the image in pixel coordinates is finally calculated according to the formula $C_1 = C_0 + T_0'P'$.

In the above formula, $$C_1 = \begin{bmatrix} S'_{1,1} & \cdots & S'_{1,j} \\ \vdots & \ddots & \vdots \\ S'_{k,1} & \cdots & S'_{k,j} \end{bmatrix}, C_0 = \begin{bmatrix} S_{1,1} & \cdots & S_{1,j} \\ \vdots & \ddots & \vdots \\ S_{k,1} & \cdots & S_{k,j} \end{bmatrix},$$

$C_0$ is the coordinate position information of the image element, P' is a physical size corresponding to the unit pixel, and S is the pixel.

This disclosure also provide a system for optical calibration of a 3D printer, which is based on the method for optical calibration of the 3D printer described in any of the above technical schemes. Therefore, it has all the beneficial technical effects of the method, and will not be repeated here.

Further, in the above technical scheme, the system for optical calibration of the 3D printer includes a camera apparatus, an optical machine, a calibration apparatus and a calibration plate; wherein, the calibration plate is placed on the projection platform of the 3D printer, and a plurality of calibration points distributed in matrix are formed on the calibration plate; the optical machine is arranged above or below the projection platform for projecting the actual projection points distributed in matrix to the projection platform; the camera apparatus is configured to capture the calibration points and the actual projection points on the projection platform; the calibration apparatus is communicatively connected with the camera apparatus.

BRIEF DESCRIPTION OF DRAWINGS

In order to explain the specific embodiments of this disclosure or the technical scheme in the existing technology more clearly, the drawings required in the description of the specific embodiments or the existing technology will be briefly described below. Obviously, the drawings in the following description are some embodiments of the present disclosure. For those skilled in the art, other drawings can be obtained according to these drawings without paying creative labor.

FIG. 1 is a schematic diagram of distortion of projection images in existing 3D printing technology, in which (a) is an ideal projection image, (b) is a possible barrel distortion, and (c) is a possible pincushion distortion;

FIG. 2 is a schematic flow chart of a method for optical calibration of a 3D printer according to an embodiment of the present disclosure;

REFERENCE NUMBER

Figure 3:
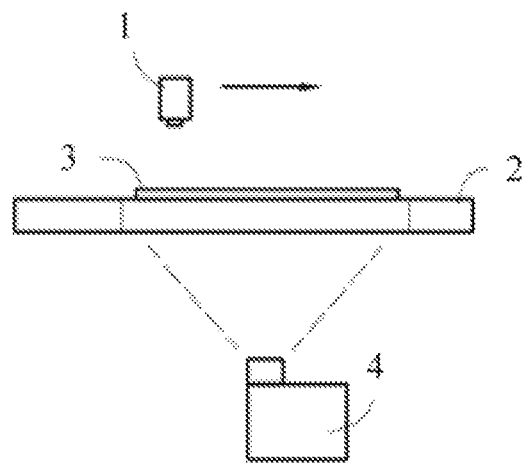
FIG. 3 is a structural schematic diagram of a system for optical calibration of a 3D printer according to an embodiment of the present disclosure.

1—camera apparatus, 2—projection platform, 3—calibration plate, 31—calibration point, 4—optical machine, 5—ideal projection image, 51—ideal projection point, 6—actual projection image, 61—actual projection point.

DETAILED DESCRIPTION

The technical scheme of this disclosure will be described clearly and completely with reference to the attached drawings. Obviously, the described embodiments are part of the embodiments of this disclosure, but not all of them.

Generally, the components of the embodiments of the present disclosure described and shown in the drawings herein can be arranged and designed in various different configurations. Therefore, the following detailed description of the embodiments of the disclosure provided in the drawings is not intended to limit the scope of the claimed disclosure, but only represents selected embodiments of the disclosure.

Based on the embodiments in this disclosure, all other embodiments obtained by a person having ordinary skill in the art without creative labor belong to the protection scope of this disclosure.

In the description of this disclosure, it should be noted that the orientation or position relationships indicated by the terms "center", "upper", "lower", "left", "right", "vertical", "horizontal", "inner" and "outer" or the like are based on the orientation or position relationships shown in the drawings, only for convenience of describing this disclosure and simplifying the description, but not for indicating or implying that the referred device or element must have a specific orientation, be constructed and operated in a specific orientation. Therefore, they cannot be understood as a limitation of this disclosure. In addition, the terms "first", "second" and "third" are only used for descriptive purposes, and cannot be understood as indicating or implying relative importance.

In the description of this disclosure, it should be noted that unless otherwise specified and limited, the terms "install", "connect" and "couple" should be understood in a broad sense. For example, they may be fixedly connected, detachably connected, or integrally connected to each other. They can be connected mechanically or electrically to each other. They can be directly connected, or indirectly connected to each other through an intermediate medium. They can also represent the internal communication of two elements. For those having ordinary skill in the art, the specific meanings of the above terms in this disclosure can be understood according to specific situations.

Referring to FIGS. 1 to 4, methods and systems for optical calibration of 3D printers according to some embodiments of the present disclosure will be described below.

Embodiment 1

Referring to FIGS. 2 to 7, an embodiment of the present disclosure provides a method for optical calibration of a 3D printer. The method is applicable to the calibration of the aforementioned optical apparatus, including optical machines, projectors, DLP (Digital Light Processing), LCD (Liquid Crystal Display) and other devices with image display. In the following, the specific disclosure of this method is illustrated on the calibration of the optical machine, and reference is made to the reference numbers appearing in the system for optical calibration of the 3D printer described below. The method for optical calibration of the 3D printer comprises the following steps.

At step 100, an optical machine 4 projects a projection image onto a projection platform 2, and a calibration plate 3 is placed on the projection platform 2 so that the calibration plate 3 is staggered with the projection image. Then, the projection platform 2 is captured. Note that this embodiment is not limited to the above shooting process, but can also adopt the method of shooting separately, that is, imaging the calibration plate and the projection image separately. For example, the calibration plate 3 is placed on the projection platform 2, and then the projection platform 2 is photographed to obtain a captured image. The optical machine 4 projects the projection image onto the projection platform 2, and then the projection platform 2 is photographed to obtain another captured image. Then the two captured images are compared. The above-mentioned sequence of separate imaging is adjustable.

At step 200, the coordinates of the calibration points 31 and the actual projection points are identified according to the captured image, so as to obtain a matrix of calibration points and a matrix of actual projection points.

At step 300, the matrix of calibration points and/or the matrix of actual projection points are/is rotated and translated, and then a distance value $T_0$ between the calibration points 31 and the actual projection points 61 in an image coordinate system is calculated.

At step 400, the $T_0$ in the image coordinate system is converted into an offset $C_1$ in the pixel coordinate system, and an initial ideal projection image 5 (which is a bitmap composed of ideal projection points 51) can be inversely distorted according to the offset $C_1$. Then, the projection image after inverse distortion processing is projected again to obtain a new actual projection image, so that the error between the new actual projection image and the ideal projection image 5 meets the requirements. It is noted that the subsequent inverse distortion processing in step 400 can be applied to actual 3D printing to process various printed images.

Both $T_0$ and $C_1$ are matrices composed of vectors, see the following for details.

Figure 4:
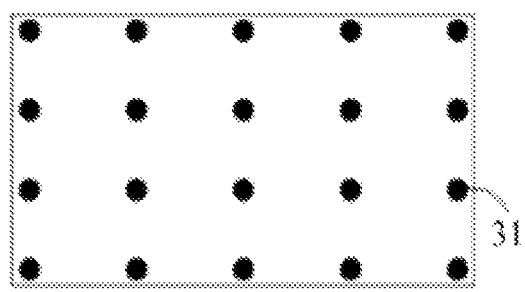
FIG. 4 is a schematic diagram of a calibration plate captured according to an embodiment of the disclosure.
Figure 5:
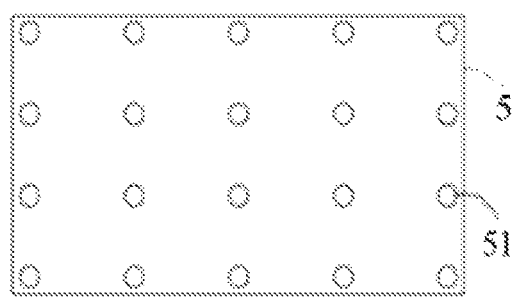
FIG. 5 is a schematic diagram of ideal projection captured according to an embodiment of the disclosure.

As shown in FIG. 5, the ideal projection image 5 is a bitmap composed of ideal projection points 51. As shown in FIG. 4, the calibration plate 3 is also provided with a corresponding bitmap.

Figure 7:
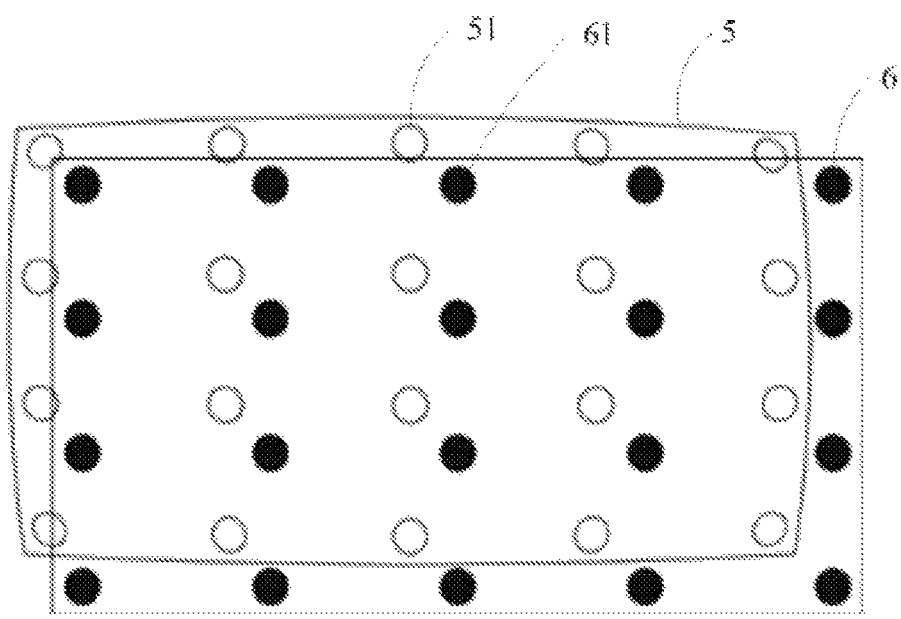
FIG. 7 is a schematic diagram of a projection platform captured in an embodiment of the disclosure.

In order to better identify the calibration points 31 and the actual projection points 61, the positions of the calibration plate 3 and the actual projection image 6 are staggered, as shown in FIG. 7. In other words, portion or all of the calibration points 31 will not coincide with the actual projection points 61.

Therefore, this method for calibration can significantly eliminate the influence of lens optical distortion, and ensure the accuracy of 3D printing. Especially, this method converts the offset of each actual projection point 61 into the offset of each pixel point, which belongs to the adjustment based on pixel level. As compared with the common method for calibration, the calibration result of this method is more accurate, which makes the error between the actual projection image 6 and the ideal projection image 5 smaller.

The calibration plate 3 is staggered from the projection image, so that portion or all of the calibration points 31 do not overlap with the actual projection points 61, which is convenient for better identifying the calibration points 31 and the actual projection points 61.

Since the calibration plate 3 is placed on the projection platform 2, there must be an included angle between the calibration plate 3 and the projection platform 2. This will affect the later calibration results. Therefore, in this method, the matrix of the calibration points and/or the matrix of the actual projection points are/is rotated and translated to convert the calibration points 31 and the actual projection points 61 into a same coordinate system for later operation. This effectively eliminates the influence of the above included angle error and makes the calculated calibration result more accurate.

In this embodiment, preferably, in step 200, the matrix of calibration points is obtained as $$P_1 = \begin{bmatrix} O_{1,1} & \cdots & O_{1,n} \\ \vdots & \ddots & \vdots \\ O_{m,1} & \cdots & O_{m,n} \end{bmatrix},$$

and the matrix of actual projection points is obtained as $$P_2 = \begin{bmatrix} L_{1,1} & \cdots & L_{1,n} \\ \vdots & \ddots & \vdots \\ L_{m,1} & \cdots & L_{m,n} \end{bmatrix},$$

wherein the data of $P_1$ and $P_2$ are based on the image coordinate system, and its unit is mm, m and n are the number of rows and columns of the matrix respectively.

In order to capture the calibration points 31 and the actual projection points 61 at the same time, the calibration plate 3 is staggered from the actual projection point 61, so it is necessary to rotate and translate the calibration points 31 and the actual projection points 61 to the same coordinate system.

In this embodiment, preferably, in step 300, the rotated matrix of the calibration points and the rotated matrix of the actual projection points are as follows: $P_1'=R_1 P_1$, $P_2'=R_2 P_2$.

$P_1'$ is the rotated matrix of calibration points. $P_2'$ is the rotated matrix of actual projection points. $R_1$ and $R_2$ are rotation matrix parameters, and the specific calculation method is as follows.

For the rotation operation, the principle is as follows:

$$\begin{cases} x = x'\cos\theta - y'\sin\theta \\ y = x'\sin\theta + y'\cos\theta \end{cases}.$$

A corresponding matrix formula is as follows:

$$\begin{bmatrix} x \\ y \end{bmatrix} = \begin{bmatrix} \cos\theta & -\sin\theta \\ \sin\theta & \cos\theta \end{bmatrix} \begin{bmatrix} x' \\ y' \end{bmatrix} = R \begin{bmatrix} x' \\ y' \end{bmatrix},$$

thus the rotation matrix parameter is obtained as $$R = \begin{bmatrix} \cos\theta & -\sin\theta \\ \sin\theta & \cos\theta \end{bmatrix},$$

In the above formula, x' and y' are the rotated coordinate points; x and y are the original coordinate points.

In the rotation operation, the deflection angle θ can be calculated by taking oblique points, horizontal points or vertical points (equivalent to taking oblique lines, horizontal lines or straight lines to calculate the deflection angle of line segments).

Note that the matrix of the calibration points and the matrix of projection points may be rotated and translated at the same time, or only one of them may be rotated and translated.

After the rotation operation is completed, $T_0$ is calculated according to $T_0 = P_2' - P_1' - T'$ (where the "$P_2' - P_1'$" means that $P_2'$ is translated so that it just overlaps with $P_1'$, and then the result is subtracted from T', $T_0$ can be calculated), i.e.

$$T_0 = \begin{bmatrix} d_{1,1} & \cdots & d_{1,n} \\ \vdots & \ddots & \vdots \\ d_{m,1} & \cdots & d_{m,n} \end{bmatrix}.$$

Then, the translation operation is completed.

In the above formula, d is a center offset between the calibration point and the projection point after rotation and translation; T' is mainly for translating the matrix. Because lens distortion will cause errors in the calculation of T', T' is taken from an area with a smallest distortion, that is, the projection points in the center area of the projection platform and the corresponding calibration points in the center area of the calibration plate are selected (further, the area with the smallest actual distortion can be calculated by using the least square method for the whole image area). The matrix T' is obtained by the difference between the two. In the calculation process, the value of T' is optimized by the least square method.

The specific transformation is as follows: firstly, the parameters in $T_0$ matrix are transformed into the parameters in pixel coordinate system, and then the result $$T_0' = \begin{bmatrix} d_{1,1}' & \cdots & d_{1,j}' \\ \vdots & \ddots & \vdots \\ d_{k,1}' & \cdots & d_{k,j}' \end{bmatrix}$$

can be obtained by fitting operation.

In the above formula, d' is a center offset between the calibration point and the projection point in the pixel coordinate system; j and k respectively correspond to the length and width of the resolution of the image. For example, considering the resolution of the optical machine 4 on the market at present, j×k may be 1920×1080, 2560×1600, 3840×2160, 1280×800, 1280×720, etc.

Here, it should be noted that the selection of the fitting algorithm can be but not limited to the following methods, which can be selected according to specific conditions.

Polynomial Fitting:

$$f(x) = a_n x^n + a_{n-1} x^{n-1} + \ldots + a^1 x^1 + a_0 x^0$$

Fourier Function Fitting (Fourier):

$$f(x) = a_n \cos(nxw) + b_n \sin(nxw) + a_{n-1} \cos((n-1)xw) + b_{n-1} \sin((n-1)xw) + \ldots + a_1 \cos(xw) + b_1 \sin(xw) + a_0$$

Inverse Trigonometric Function Fitting (SumOfSine):

$$f(x) = a_n \sin(bx + c_n) + a_{n-1} \sin(b_{n-1}x + c_{n-1}) + \ldots + a_1 \sin(b_1 x + c_1)$$

On the basis of the above series of transformations and calculations, the position information of all pixels in the image in pixel coordinates is finally calculated according to the formula $C_1 = C_0 + T_0'P'$.

In the above formula, $$C_1 = \begin{bmatrix} S_{1,1}' & \cdots & S_{1,j}' \\ \vdots & \ddots & \vdots \\ S_{k,1}' & \cdots & S_{k,j}' \end{bmatrix}, C_0 = \begin{bmatrix} S_{1,1} & \cdots & S_{1,j} \\ \vdots & \ddots & \vdots \\ S_{k,1} & \cdots & S_{k,j} \end{bmatrix},$$

$C_0$ is the coordinate position information of the image element, P' is a physical size corresponding to the unit pixel, and S is the pixel.

Embodiment 2

Embodiments of the present disclosure also provide a system for optical calibration of a 3D printer, which is based on the method for optical calibration of the 3D printer described in any of the above embodiments. Therefore, it has all the beneficial technical effects of the method, and will not be repeated here.

In this embodiment, preferably, as shown in FIG. 2, the system for optical calibration of the 3D printer includes a camera apparatus 1, an optical machine 4, a calibration apparatus and a calibration plate 3. The calibration plate 3 is placed on the projection platform 2 of the 3D printer, and a plurality of calibration points 31 distributed in matrix are formed on the calibration plate 3. The optical machine 4 is arranged above or below the projection platform 2 for projecting the actual projection points 61 distributed in matrix to the projection platform 2. The camera apparatus 1 is configured to capture the calibration points 31 and the projection points on the projection platform 2. The calibration apparatus is communicatively connected with the camera apparatus 1.

According to the structure described above, the optical machine 4 to be calibrated will project the projection onto the projection platform 2. The optical machine 4 may be arranged at the upper or the bottom of the projection platform 2, which is not limited here. A camera apparatus 1 (e.g., a camera) is configured to capture the projection platform 2. The calibration apparatus may receive the image captured by the camera apparatus 1 and perform step 200, step 300, step 400 and step 500 in the method for calibration based on the image.

As shown in FIG. 4, the calibration plate 3 is provided with a corresponding bitmap composed of calibration points 31.

However, as shown in FIGS. 4 to 7, the ideal projection points 51, the actual projection points 61 and the calibration points 31 are different. The "difference" may be a difference in color or a difference in shape. In this embodiment, in the images taken by the camera, the projection points appear as a white point and the calibration points 31 appear as a black point. This is beneficial to distinguish the calibration points 31 from the projection points.

It should be reminded that the shape, number and size of the sampling points (including the calibration points 31 and the actual projection points 61) may be set as required, and are not limited in the disclosure. In addition, the sampling points may be easily recognizable patterns such as squares, circles (i.e., dots), triangles and polygons.

Figure 6:
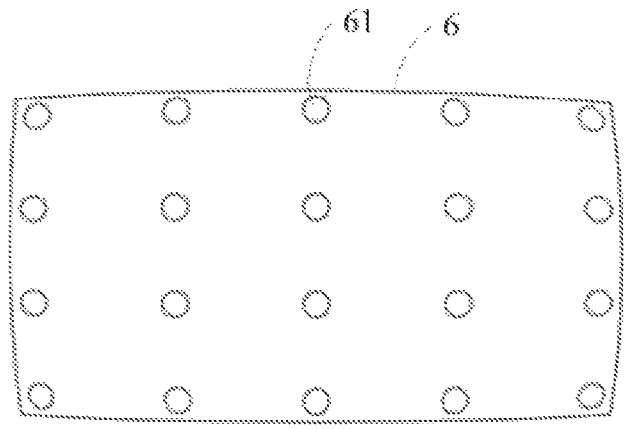
FIG. 6 is a schematic diagram of actual projection captured according to an embodiment of the disclosure.

After the calibration plate 3 is placed, the camera apparatus 1 will capture the projection platform 2 to capture the calibration plate 3 and the actual projection image 6. As shown in FIG. 5 and FIG. 6, the actual projection image 6 has barrel distortion as compared with the ideal projection image 5. As shown in FIG. 7, in the image captured by the camera, the center of the calibration plate 3 does not coincide with the center of the actual projection image 6. On the contrary, the calibration plate 3 and the actual projection FIG. 6 are staggered (the actual projection image 6 is a bitmap composed of actual projection points 61), and portion or all of the actual projection points 61 and the calibration points 31 do not coincide.

In the preferred scheme, in order to ensure the clarity, the camera can capture multiple clear images by means of multiple shots, so that all projection points and calibration points 31 are captured.

After capturing, the calibration apparatus will process the captured image to identify the calibration points 31 and the projection points, so as to obtain the coordinates of the calibration points 31 and the coordinates of the actual projection points 61.

It should be noted that the calibration system can be a separate apparatus independent of the 3D printer, or it can be composed of matching calibration components and parts of the 3D printer. For example, the matching calibration components may include a camera apparatus 1, a calibration plate 3 and a calibration module. The projection platform 2 may be a transparent plane arranged on the frame of the 3D printer or the bottom surface of the tray of the 3D printer.

Finally, it should be noted that the above embodiments are only used to illustrate the technical scheme of this disclosure, but not to limit it. Although the disclosure has been described in detail with reference to the aforementioned embodiments, a person having ordinary skill in the art should understand that the technical schemes described in the aforementioned embodiments can still be modified, or some or all of the technical features can be equivalently replaced. However, these modifications or substitutions do not make the essence of the corresponding technical schemes deviate from the scope of the technical schemes of each embodiment of this disclosure.

What is claimed is:

1. A method for optical calibration of a 3D printer, comprising:
   at step 100, projecting, by an optical apparatus of the 3D printer, a projection image to a projection platform, placing a calibration plate on the projection platform, and capturing, by a camera apparatus, the projection platform;
   at step 200, identifying, by a calibration apparatus, coordinates of calibration points of the calibration plate and coordinates of actual projection points of the projection image projected by the optical apparatus, according to the captured image, to obtain a matrix of calibration points $P_1$ of the calibration plate and a matrix of actual projection points $P_2$ of the projection image projected by the optical apparatus;
   at step 300, rotating and translating, by the calibration apparatus, the matrix of the calibration points of the calibration plate and/or the matrix of the actual projection points of the projection image to convert the calibration points and the actual projection points into a same coordinate system, and then calculating a distance value matrix $T_0$ based on the matrix of the calibration points of the calibration plate and the matrix of the actual projection points of the projection image projected by the optical apparatus in an image coordinate system;
   at step 400, converting, by the calibration apparatus, the distance value matrix $T_0$ in the image coordinate system into an offset matrix $C_1$ in a pixel coordinate system, and inversely distorting an initial ideal projection image according to the offset matrix $C_1$ to obtain a new actual projection image, wherein when an error between the new actual projection image and the initial ideal projection image meets a requirement, the optical apparatus of the 3D printer is calibrated;
   wherein, both $T_0$ and $C_1$ are matrices composed of vectors;
   wherein at step 300, the rotated matrix of calibration points and the rotated matrix of actual projection points are as follows: $P_1'=R_1 P_1$, $P_2'=R_2 P_2$;
   where $P_1'$ is the rotated matrix of calibration points, $P_2'$ is the rotated matrix of actual projection points, and $R_1$ and $R_2$ are rotation matrix parameters.

2. The method for optical calibration of the 3D printer of claim 1, wherein the projection image is projected by the optical apparatus to the projection platform, and the calibration plate is placed on the projection platform, so that the calibration plate is staggered with the projection image, and then the projection platform is captured by the camera apparatus.

3. The method for optical calibration of the 3D printer of claim 1, wherein at step 200, the matrix of calibration points of the calibration plate is obtained by the calibration apparatus as $$P_1 = \begin{bmatrix} O_{1,1} & \cdots & O_{1,n} \\ \vdots & \ddots & \vdots \\ O_{m,1} & \cdots & O_{m,n} \end{bmatrix},$$

and the matrix of actual projection points of the projection image projected by the optical apparatus is obtained by the calibration apparatus as $$P_2 = \begin{bmatrix} L_{1,1} & \cdots & L_{1,n} \\ \vdots & \ddots & \vdots \\ L_{m,1} & \cdots & L_{m,n} \end{bmatrix};$$

where the data of $P_1$ and $P_2$ are based on the image coordinate system, and its unit is mm; m and n are the number of rows and columns of the matrix respectively.

4. The method for optical calibration of the 3D printer of claim 1, wherein for the rotation operation, the principle is as follows:

$$\begin{cases} x = x'\cos\theta - y'\sin\theta \\ y = x'\sin\theta + y'\cos\theta \end{cases};$$

wherein, a corresponding matrix formula is as follows:

$$\begin{bmatrix} x \\ y \end{bmatrix} = \begin{bmatrix} \cos\theta & -\sin\theta \\ \sin\theta & \cos\theta \end{bmatrix} \begin{bmatrix} x' \\ y' \end{bmatrix} = R \begin{bmatrix} x' \\ y' \end{bmatrix},$$

thus the rotation matrix parameter is obtained by the calibration apparatus as $$R = \begin{bmatrix} \cos\theta & -\sin\theta \\ \sin\theta & \cos\theta \end{bmatrix},$$

where x' and y' are the rotated coordinate points; x and y are the original coordinate points.

5. The method for optical calibration of the 3D printer of claim 4, wherein after the rotation operation is completed, $T_0$ is calculated by the calibration apparatus according to $T_0 = P_2' - P_1' - T'$, wherein $$T_0 = \begin{bmatrix} d_{1,1} & \cdots & d_{1,n} \\ \vdots & \ddots & \vdots \\ d_{m,1} & \cdots & d_{m,n} \end{bmatrix},$$

where d is a center offset between the calibration point of the calibration plate and the projection point of the projection image projected by the optical apparatus after rotation and translation; T' is a difference between the matrix of the actual projection points of the projection image projected by the optical apparatus and the matrix of the calibration points of the calibration plate taken from an area with a smallest distortion.

6. The method for optical calibration of the 3D printer of claim 5, wherein the parameters in $T_0$ matrix are firstly transformed into the parameters in pixel coordinate system, by the calibration apparatus, and then the result $$T_0' = \begin{bmatrix} d_{1,1}' & \cdots & d_{1,j}' \\ \vdots & \ddots & \vdots \\ d_{k,1}' & \cdots & d_{k,j}' \end{bmatrix},$$

is obtained by fitting operation;
where d' is a center offset between the calibration point of the calibration plate and the projection point of the projection image projected by the optical apparatus after rotation and translation; j and k respectively correspond to the length and width of the resolution of the image.

7. The method for optical calibration of the 3D printer of claim 6, wherein the position information of all pixels in the image in pixel coordinates is finally calculated by the calibration apparatus according to the formula $C_1 = C_0 + T_0'P'$, where $$C_1 = \begin{bmatrix} S_{1,1}' & \cdots & S_{1,j}' \\ \vdots & \ddots & \vdots \\ S_{k,1}' & \cdots & S_{k,j}' \end{bmatrix}, C_0 = \begin{bmatrix} S_{1,1} & \cdots & S_{1,j} \\ \vdots & \ddots & \vdots \\ S_{k,1} & \cdots & S_{k,j} \end{bmatrix},$$

$C_0$ is the coordinate position information of the image element, P' is a physical size corresponding to the unit pixel, and S is the pixel.

8. A system for optical calibration of a 3D printer, wherein the system for optical calibration of the 3D printer is applied to a method for optical calibration of the 3D printer, the method comprising:
at step 100, projecting, by an optical apparatus of the 3D printer, a projection image to a projection platform, placing a calibration plate on the projection platform, and capturing, by a camera apparatus, the projection platform;
at step 200, identifying, by a calibration apparatus, coordinates of calibration points of the calibration plate and coordinates of actual projection points of the projection image projected by the optical apparatus, according to the captured image, to obtain a matrix of calibration points $P_1$ of the calibration plate and a matrix of actual projection points $P_2$ of the projection image projected by the optical apparatus;
at step 300, rotating and translating, by the calibration apparatus, the matrix of the calibration points of the calibration plate and/or the matrix of the actual projection points of the projection image to convert the calibration points and the actual projection points into a same coordinate system, and then calculating a distance value matrix $T_0$ based on the matrix of the calibration points of the calibration plate and the matrix of the actual projection points of the projection image projected by the optical apparatus in an image coordinate system;
at step 400, converting, by the calibration apparatus, the distance value matrix $T_0$ in the image coordinate system into an offset matrix $C_1$ in a pixel coordinate system, and inversely distorting an initial ideal projection image according to the offset matrix $C_1$ to obtain a new actual projection image, wherein when an error between the new actual projection image and the initial idea projection image meets a requirement, the optical apparatus of the 3D printer is calibrated;
wherein, both $T_0$ and $C_1$ are matrices composed of vectors;
wherein at step 300, the rotated matrix of calibration points and the rotated matrix of actual projection points are as follows: $P_1' = R_1 P_1$, $P_2' = R_2 P_2$;
where $P_1'$ is the rotated matrix of calibration points, $P_2'$ is the rotated matrix of actual projection points, and $R_1$ and $R_2$ are rotation matrix parameters.

9. The system for optical calibration of the 3D printer of claim 8, wherein the system for optical calibration of the 3D printer includes the camera apparatus, an optical machine, the calibration apparatus and the calibration plate; wherein, the calibration plate is placed on the projection platform of the 3D printer, and a plurality of calibration points distributed in matrix are formed on the calibration plate; the optical machine is arranged above or below the projection platform for projecting the actual projection points distributed in matrix to the projection platform; the camera apparatus is configured to capture the calibration points of the calibration plate and the actual projection points of the projection image projected by the optical apparatus on the projection platform; the calibration apparatus is communicatively connected with the camera apparatus.

10. The system for optical calibration of the 3D printer of claim 8, wherein the projection image is projected by the optical apparatus to the projection platform, and the calibration plate is placed on the projection platform, so that the calibration plate is staggered with the projection image, and then the projection platform is captured, by the camera apparatus.

11. The system for optical calibration of the 3D printer of claim 8, wherein at step 200, the matrix of calibration points of the calibration plate is obtained by the calibration apparatus as $$P_1 = \begin{bmatrix} O_{1,1} & \cdots & O_{1,n} \\ \vdots & \ddots & \vdots \\ O_{m,1} & \cdots & O_{m,n} \end{bmatrix},$$

and the matrix of actual projection points of the projection image projected by the optical apparatus is obtained by the calibration apparatus as $$P_2 = \begin{bmatrix} L_{1,1} & \cdots & L_{1,n} \\ \vdots & \ddots & \vdots \\ L_{m,1} & \cdots & L_{m,n} \end{bmatrix};$$

where the data of $P_1$ and $P_2$ are based on the image coordinate system, and its unit is mm; m and n are the number of rows and columns of the matrix respectively.

12. The system for optical calibration of the 3D printer of claim 8, wherein for the rotation operation, the principle is as follows:

$$\begin{cases} x = x'\cos\theta - y'\sin\theta \\ y = x'\sin\theta + y'\cos\theta \end{cases};$$

wherein, a corresponding matrix formula is as follows:

$$\begin{bmatrix} x \\ y \end{bmatrix} = \begin{bmatrix} \cos\theta & -\sin\theta \\ \sin\theta & \cos\theta \end{bmatrix} \begin{bmatrix} x' \\ y' \end{bmatrix} = R \begin{bmatrix} x' \\ y' \end{bmatrix},$$

thus the rotation matrix parameter is obtained by the calibration apparatus as $$R = \begin{bmatrix} \cos\theta & -\sin\theta \\ \sin\theta & \cos\theta \end{bmatrix},$$

where x' and y' are the rotated coordinate points; x and y are the original coordinate points.

13. The system for optical calibration of the 3D printer of claim 12, wherein after the rotation operation is completed, $T_0$ is calculated by the calibration apparatus according to $T_0 = P_2' - P_1' - T'$, wherein $$T_0 = \begin{bmatrix} d_{1,1} & \cdots & d_{1,n} \\ \vdots & \ddots & \vdots \\ d_{m,1} & \cdots & d_{m,n} \end{bmatrix},$$

where d is a center offset between the calibration point of the calibration plate and the projection point of the projection image projected by the optical apparatus after rotation and translation; T' is a difference between the matrix of the actual projection points of the projection image projected by the optical apparatus and the matrix of the calibration points of the calibration plate taken from an area with a smallest distortion.

14. The system for optical calibration of the 3D printer of claim 13, wherein the parameters in $T_0$ matrix are firstly transformed into the parameters in pixel coordinate system, by the calibration apparatus, and then the result $$T_0' = \begin{bmatrix} d_{1,1}' & \cdots & d_{1,j}' \\ \vdots & \ddots & \vdots \\ d_{k,1}' & \cdots & d_{k,j}' \end{bmatrix},$$

is obtained by fitting operation;

where d' is a center offset between the calibration point of the calibration plate and the projection point of the projection image projected by the optical apparatus after rotation and translation; j and k respectively correspond to the length and width of the resolution of the image.

15. The system for optical calibration of the 3D printer of claim 14, wherein the position information of all pixels in the image in pixel coordinates is finally calculated by the calibration apparatus according to the formula $C_1 = C_0 + T_0'P'$, where $$C_1 = \begin{bmatrix} S_{1,1}' & \cdots & S_{1,j}' \\ \vdots & \ddots & \vdots \\ S_{k,1}' & \cdots & S_{k,j}' \end{bmatrix}, C_0 = \begin{bmatrix} S_{1,1} & \cdots & S_{1,j} \\ \vdots & \ddots & \vdots \\ S_{k,1} & \cdots & S_{k,j} \end{bmatrix},$$

$C_0$ is the coordinate position information of the image element, P' is a physical size corresponding to the unit pixel, and S is the pixel.

* * * * *